US008394744B2

(12) United States Patent
Woytowich et al.

(10) Patent No.: US 8,394,744 B2
(45) Date of Patent: Mar. 12, 2013

(54) LOW DENSITY CEMENTITIOUS COMPOSITIONS

(75) Inventors: Wes Woytowich, Calgary (CA); Bill Carruthers, Montgomery, TX (US); Benoit Cotnoir, Frisco, TX (US); Paul Lehoux, Kirkland (CA); Richard McCorkle, Paducah, KY (US); Eric Bowman, Metropolis, IL (US)

(73) Assignee: LaFarge, Paris (FR)

( * ) Notice: Subject to any disclaimer, the term of this patent is extended or adjusted under 35 U.S.C. 154(b) by 451 days.

(21) Appl. No.: 12/781,306

(22) Filed: May 17, 2010

(65) Prior Publication Data

US 2010/0294496 A1    Nov. 25, 2010

Related U.S. Application Data

(60) Provisional application No. 61/180,665, filed on May 22, 2009.

(51) Int. Cl.
*E21B 33/13* (2006.01)
*C04B 7/02* (2006.01)

(52) U.S. Cl. ........ 507/269; 507/233; 507/234; 166/285; 106/716

(58) Field of Classification Search .................. None
See application file for complete search history.

(56) References Cited

U.S. PATENT DOCUMENTS

| | | |
|---|---|---|
| 5,167,710 A | 12/1992 | Leroux et al. |
| 5,494,514 A | 2/1996 | Goodson et al. |
| 5,531,824 A | 7/1996 | Burkes et al. |
| 5,584,926 A | 12/1996 | Borgholm et al. |
| 5,714,002 A | 2/1998 | Styron |
| 5,714,003 A | 2/1998 | Styron |
| 6,008,275 A | 12/1999 | Moreau et al. |
| 6,030,447 A | 2/2000 | Naji et al. |
| 6,145,591 A | 11/2000 | Boncan et al. |
| 6,197,107 B1 | 3/2001 | Stav et al. |
| 6,230,804 B1 | 5/2001 | Mueller et al. |
| 6,241,815 B1 | 6/2001 | Bonen |
| 6,264,737 B1 | 7/2001 | Liotta, Jr. et al. |
| 6,290,770 B1 | 9/2001 | Moreau et al. |
| 6,485,561 B1 | 11/2002 | Dattel |
| 6,500,254 B1 | 12/2002 | Baxter et al. |
| 6,508,305 B1 | 1/2003 | Brannon et al. |
| 6,514,595 B1 | 2/2003 | Sprouts |
| 6,516,883 B1 | 2/2003 | Chatterji et al. |
| 6,572,697 B2 | 6/2003 | Gleeson et al. |
| 6,620,879 B1 | 9/2003 | Albrecht et al. |
| 6,626,243 B1 | 9/2003 | Go Boncan |
| 6,641,658 B1 | 11/2003 | Dubey |
| 6,644,405 B2 | 11/2003 | Vijn et al. |
| 6,645,289 B2 | 11/2003 | Sobolev et al. |
| 6,739,806 B1 | 5/2004 | Szymanski et al. |
| 6,767,398 B2 | 7/2004 | Trato |
| 6,777,103 B2 | 8/2004 | Merkley et al. |
| 6,858,074 B2 | 2/2005 | Anderson et al. |
| 6,875,266 B1 | 4/2005 | Naji et al. |
| 6,902,002 B1 | 6/2005 | Chatterji et al. |
| 6,942,727 B2 | 9/2005 | Daczko et al. |
| 6,957,702 B2 | 10/2005 | Brothers et al. |
| 7,041,167 B2 | 5/2006 | Jiang |
| 7,044,224 B2 | 5/2006 | Nguyen |
| 7,048,793 B2 | 5/2006 | Chun et al. |
| 7,055,603 B2 | 6/2006 | Caveny et al. |
| 7,077,203 B1 | 7/2006 | Roddy et al. |
| 7,174,962 B1 | 2/2007 | Roddy et al. |
| 7,204,307 B2 | 4/2007 | Roddy et al. |
| 7,213,646 B2 | 5/2007 | Roddy et al. |
| 7,284,608 B2 | 10/2007 | Reddy et al. |
| 7,335,252 B2 | 2/2008 | Roddy et al. |
| 7,387,675 B2 | 6/2008 | Roddy et al. |
| 7,442,248 B2 | 10/2008 | Timmons |
| 7,455,798 B2 | 11/2008 | Datta et al. |
| 7,459,019 B2 | 12/2008 | Barlet-Gouedard et al. |
| 7,462,236 B2 | 12/2008 | Chun et al. |
| 7,497,904 B2 | 3/2009 | Dulzer et al. |
| 7,510,609 B2 | 3/2009 | Caveny et al. |
| 7,524,369 B2 | 4/2009 | Caveny et al. |
| 7,537,655 B2 * | 5/2009 | Abbate ...................... 106/713 |
| 7,543,642 B2 | 6/2009 | Reddy et al. |
| 7,670,423 B2 | 3/2010 | Szymaski et al. |
| 7,867,954 B2 * | 1/2011 | Warrender et al. ........... 507/269 |
| 2003/0233962 A1 | 12/2003 | Dongell |
| 2004/0149174 A1 | 8/2004 | Farrington et al. |
| 2004/0187740 A1 * | 9/2004 | Timmons ..................... 106/705 |
| 2004/0194960 A1 | 10/2004 | DiLullo et al. |
| 2005/0166803 A1 | 8/2005 | Dillenbeck et al. |
| 2006/0174802 A1 | 8/2006 | Bedel et al. |
| 2006/0292358 A1 | 12/2006 | Robertson et al. |
| 2007/0029088 A1 | 2/2007 | Di Lullo Arias et al. |
| 2007/0056477 A1 | 3/2007 | Mueller |

(Continued)

FOREIGN PATENT DOCUMENTS

| | | |
|---|---|---|
| CN | 101305068 | 11/2008 |
| EP | 1900703 | 3/2008 |

(Continued)

OTHER PUBLICATIONS

International Search Report for PCT/US2010/035560 dated Sep. 20, 2010.

*Primary Examiner* — John J Figueroa
(74) *Attorney, Agent, or Firm* — Pillsbury Winthrop Shaw Pittman, LLP

(57) ABSTRACT

A manufactured cementitious binder including a hydraulic binder in an amount in the range of from about 40 to 75% by weight of the cementitious binder; metakaolin in an amount greater than about 5% by weight of the cementitious binder; silica fume in an amount up to about 15% by weight of the cementitious binder; and cement kiln dust in an amount greater than about 10% by weight of the cementitious binder, the cement kiln dust including chlorine in an amount of at least 0.1% by weight of the cement kiln dust, the cementitious binder providing a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

30 Claims, No Drawings

U.S. PATENT DOCUMENTS

| | | |
|---|---|---|
| 2007/0095255 A1 | 5/2007 | Abbate et al. |
| 2008/0099122 A1 | 5/2008 | Andersen et al. |
| 2008/0099203 A1 | 5/2008 | Mueller et al. |
| 2008/0141907 A1 | 6/2008 | Campbell |
| 2008/0178770 A1 | 7/2008 | Schumacher et al. |
| 2008/0202752 A1 | 8/2008 | Lopez et al. |
| 2008/0275149 A1 | 11/2008 | Ladely et al. |
| 2009/0011207 A1 | 1/2009 | Dubey |
| 2009/0162602 A1 | 6/2009 | Cottier et al. |
| 2009/0291037 A1 | 11/2009 | Khadilkar et al. |
| 2009/0308612 A1 | 12/2009 | Weaver et al. |
| 2012/0012314 A1 * | 1/2012 | Woytowich et al. .......... 166/285 |
| 2012/0012315 A1 * | 1/2012 | Woytowich et al. .......... 166/285 |

FOREIGN PATENT DOCUMENTS

| | | |
|---|---|---|
| EP | 1900704 | 3/2008 |
| EP | 1900705 | 3/2008 |
| GB | 2396861 | 7/2004 |
| WO | WO 93/10972 | 6/1993 |
| WO | WO 9749644 | 12/1997 |
| WO | WO 2007/028952 | 3/2007 |

* cited by examiner

LOW DENSITY CEMENTITIOUS COMPOSITIONS

CROSS REFERENCE TO RELATED APPLICATION

This application claims priority and benefit under 35 U.S.C. §119(e) to U.S. Provisional Patent Application No. 61/180,665, entitled "Low Density Cementitious Compositions," filed on May 22, 2009. The content of that application is incorporated herein in its entirety by reference.

FIELD

The present invention relates to cement, concrete and mortar compositions and, more particularly, to low density cementitious compositions.

BACKGROUND

Cementitious settable compositions are used in the treatment and drilling of well bores extending from the surface of the earth to subterranean formations. Generally, the drilling of a well for the recovery of oil, gas or water from a subterranean formation involves placing and securing a casing in the well bore by cementing. In this operation, cement is pumped downward from the surface of the earth to the bottom of the well. After the cement (i.e. the cementitious settable composition) has been pumped between the casing and the well, pumping is discontinued and the cement is permitted to set in place.

In cementing procedures in a well bore, it is sometimes desirable that the cement slurry has a low density. Aside from being costly due to a high ratio of cement to water, high density cement slurries require higher pumping pressures in order to place them at the desired positions in the well bore. Further, high density cement slurries impose high static and dynamic pressures upon not only the formation to be treated but upon the other formations as well. At the locations where these other formations are porous, the high pressures exerted in the well bore can result in loss of the cement slurry into the formations or loss of the water from the cement slurry into the formations. As a result, the cement can set in an unintended position in the well bore. Thus, when designing cementitious settable compositions for subterranean applications, design engineers should ensure that the compositions provide adequate compressive strength and zonal isolation. Aside from providing strength and zonal isolation one should ensure that the selected compositions meet all regulatory guidelines for zonal isolation for the respective area. Another area of concern is to ensure that the cementitious composition selected to provide zonal isolation has the capability to be seen by down-hole interpretation methods (bond logs).

In order to obtain cement slurries having adequate mechanical and rheological properties and a density equal to or less than about 13 pounds per gallon, it is known in the art to use lightweight additives such as, for example, microspheres (e.g. glass beads) and foaming agents, as a partial substitute for water. However, the use of lightweight additives significantly adds undesirable costs as well as industrial challenges to the preparation of slurries. Lightweight additives are generally the most expensive materials in low density cementitious compositions. Further, the use of foaming agents or other similar chemicals for reducing the density of cement slurries may create hazards and pose environmental concerns.

SUMMARY

Therefore, it is desirable to provide lightweight cementitious settable compositions or cement slurries that exhibit enhanced compressive performances while having the highest possible water content. The high water content enables one to produce the lowest slurry weight, which then requires the lowest amount of lightweight additives to achieve the desired density. A lightweight additive is defined hereinafter as any material other than water that is used to provide a cement slurry that has a low density and desired mechanical and rheological properties. Examples of lightweight additives include microspheres, foaming agents and the like.

In particular, it is desirable to provide lightweight cementitious settable compositions that exhibit enhanced compressive performances at densities lower than about 13 pounds per gallon (ppg) without using, or including a minimum amount of, lightweight additives such as microspheres, foaming agents or the like. Furthermore, it is desirable to provide cementitious settable compositions that exhibit enhanced compressive performances at densities equal to or lower than about 12 ppg, more preferably equal to or lower than about 11 ppg without using lightweight additives or including a reduced amount of lightweight additives such as microspheres, foaming agents or the like. In addition, it is desirable to provide cementitious settable compositions that exhibit enhanced compressive performances at densities equal to or lower than about 10 ppg, preferably equal to or lower than about 9 ppg, more preferably equal to or lower than about 8 ppg, including a minimum amount of, lightweight additives such as microspheres, foaming agents or the like.

In one aspect of the invention, there is provided a manufactured cementitious binder that includes a hydraulic binder and one or more materials having pozzolanic or non-pozzolanic properties and that exhibits a minimum of 500 psi compressive strength at 24 hours (24 h) when cured at 100 F. The manufactured cementitious binder produces a low density cementitious settable composition or slurry that has excellent oil well slurry properties such as very low fluid loss, very low segregation, good thickening time, good admixture response, good tensile strength and exceeds the safety standards set forth by the industry governing bodies without using, or using little amounts of, lightweight additives.

In one aspect of the invention, the cementitious binder produces a cementitious settable composition having a density of about 12 pounds per gallon with a 24 h compressive strength, when cured at 100 F, in the range of about 900 to 1000 psi without using lightweight additives such as microspheres, foaming agents or the like and that maintains the above slurry properties.

In one aspect of the invention, there is provided a manufactured cementitious binder including a hydraulic binder in an amount in the range of from about 40 to 75% by weight of the cementitious binder; metakaolin in an amount greater than about 5% by weight of the cementitious binder; silica fume in an amount up to about 15% by weight of the cementitious binder; and cement kiln dust in an amount greater than about 10% by weight of the cementitious binder, the cement kiln dust including chlorine in an amount of at least 0.1% by weight of the cement kiln dust, the cementitious binder providing a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

In another aspect of the invention, there is provided a manufactured cementitious binder including cement kiln dust in an amount of at least 10% by weight of the cementitious binder, the cement kiln dust including chlorine in an amount of at least 0.1% by weight of the cement kiln dust, the cementitious binder providing a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

In yet another aspect of the invention, there is provided a cementitious settable composition including water; and a cementitious binder including a hydraulic binder in an amount in the range of from about 40 to 75% by weight of the cementitious binder; metakaolin in an amount greater than about 5% by weight of the cementitious binder; silica fume in an amount up to about 15% by weight of the cementitious binder; and cement kiln dust in an amount greater than about 10% by weight of the cementitious binder, the cement kiln dust including chlorine in an amount of at least 0.1% by weight of the cement kiln dust, wherein, without a lightweight additive, the settable composition has a density lower than about 13 pounds per gallon and greater than about 11 pounds per gallon and a 24 hour compressive strength at 100 F, as hardened, of at least 500 psi.

In one aspect of the invention, there is provided a method of cementing including providing a cementitious settable composition including water; and a cementitious binder including a hydraulic binder in an amount in the range of from about 40 to 75% by weight of the cementitious binder; metakaolin in an amount greater than about 5% by weight of the cementitious binder; silica fume in an amount up to about 15% by weight of the cementitious binder; and cement kiln dust in an amount greater than about 10% by weight of the cementitious binder, the cement kiln dust including chlorine in an amount of at least 0.1% by weight of the cement kiln dust, the cementitious binder providing a cementitious settable composition, when added with water and without a lightweight additive, that has a density lower than about 13 pounds per gallon and greater than about 11 pounds per gallon and a 24 hour compressive strength at 100 F, as hardened, of at least 500 psi; and introducing the cementitious settable composition into an underground formation.

DETAILED DESCRIPTION

Various aspects of the present invention relate to a manufactured cementitious binder, a method of manufacturing the cementitious binder, a cementitious settable composition (slurry) and a method of cementing. In accordance with one embodiment of the invention, the cementitious binder and/or cementitious settable composition may be used in a variety of applications including, for example, subterranean applications, surface applications and construction applications. Subterranean applications may include, for example, primary cementing, remedial cementing, and drilling operations. In primary cementing, for example, pipe strings such as casings and liners are cemented in well bores. Well bores may include oil well bores, gas well bores, water well bores, geothermal well bores, and the like. In performing primary cementing, cement compositions are pumped into the space between the walls of a well bore and the exterior surface of the pipe string disposed therein. The cement composition is permitted to set in the space, thereby forming an annular sheath of hardened, substantially impermeable cement therein that substantially supports and positions the pipe string in the well bore and bonds the exterior surface of the pipe string to the walls of the well bore. Cement compositions are also used in plugging and abandonment operations as well as in remedial cementing operations such as plugging permeable zones or fractures in well bores, plugging cracks and holes in pipe strings, and the like.

In one aspect of the invention, the manufactured cementitious binder is configured to provide a lightweight cementitious settable composition that possesses rapid high compressive strength and prevents shrinkage without using, or including a reduced amount of, lightweight additives such as microspheres, foaming agents or the like. These cementitious characteristics are particularly desirable in cementing operations for subterranean applications. Indeed, when a cementitious settable composition is injected into the well bore and placed in the zone that is to be cemented, it is desirable that the composition presents relatively low viscosity and has effectively constant rheological properties. Once it is in place, an ideal cementitious composition should rapidly develop high compressive strength.

Furthermore, as will be appreciated by one skilled in the art, there are numerous benefits provided by such a cementitious binder. For example, in addition to the significant cost reduction in manufacturing the binder and preparing the cementitious settable compositions, there will be no or little environmental concern or hazards associated with the preparation of the cementitious settable composition as it can be prepared by simply mixing the cementitious binder with water without using, or using a little amount of, lightweight additives.

In one embodiment of the invention, the cementitious binder provides a cementitious settable composition, when added with water, that has a density lower than about 13 pounds per gallon (ppg) and a 24 hour compressive strength at 100 F, as hardened, of at least 500 psi, preferably at least 700 psi, more preferably, at least 800 psi, and more preferably at least 900 psi without using lightweight additives such as microspheres, foaming agents or the like. In yet another embodiment of the invention, the cementitious binder provides a cementitious settable composition that has a density lower than about 12 pounds per gallon, that has a 24 hour compressive strength at 100 F, as hardened, of at least 500 psi, preferably at least 700 psi, more preferably at least 800 psi, and more preferably at least 900 psi without using lightweight additives such as microspheres, foaming agents or the like. In yet another embodiment of the invention, the cementitious binder provides a cementitious settable composition that has a density lower than about 11 pounds per gallon, that has a 24 hour compressive strength at 100 F, as hardened, of at least 500 psi, preferably at least 700 psi, without using, or including a reduced amount of, lightweight additives such as microspheres, foaming agents or the like. In yet another embodiment of the invention, the cementitious binder provides a cementitious settable composition that has a density lower than about 10 pounds per gallon, has a 24 hour compressive strength at 100 F, as hardened, of at least 350 psi, preferably at least 500 psi, more preferably at least 700 psi, more preferably at least 800 psi, and even more preferably at least 900 psi, including a reduced amount of, lightweight additives such as microspheres, foaming agents or the like. In yet another embodiment of the invention, the cementitious binder provides a cementitious settable composition that has a density lower than about 9 pounds per gallon, that has a 24 hour compressive strength at 100 F, as hardened, of at least 350 psi, preferably at least 500 psi, more preferably at least 700 psi, more preferably at least 800 psi, and even more preferably at least 900 psi, including a reduced amount of, lightweight additives such as microspheres, foaming agents or the like. In yet another embodiment of the invention, the cementitious binder provides a cementitious settable composition that has a density lower than about 8 pounds per gallon, has a 24 hour compressive strength at 100 F, as hardened, of at least 350 psi, preferably at least 500 psi, more preferably at least 700 psi, more preferably at least 800 psi, and even more preferably at least 900 psi, including a reduced amount of lightweight additives such as microspheres, foaming agents or the like.

The inventors have devised that such lightweight cementitious settable compositions, which rapidly possess high compressive strength, for example, a 24 hour compressive strength at 100 F, as hardened, of at least 500 psi, preferably at least 700 psi, more preferably at least 800 psi, and more preferably at least 900 psi, without using, or including a reduced amount of, lightweight additives such as microspheres, foaming agents or the like, can be surprisingly obtained with a cementitious binder including cement kiln dust (CKD) that contains selected compounds in specific amounts by weight of the cement kiln dust. In addition, the inventors have devised that the performance of such lightweight compositions can further be enhanced using a cementitious binder including cement kiln dust that contains selected compounds in specific amounts by weight of the cement kiln dust, a hydraulic binder, metakoalin and silica fume in specific amounts by weight of the cementitious binder and, without using, or including a reduced amount of, lightweight additives such as microspheres, foaming agents or the like. It has been found that the performance of the low density cementitious settable composition, among which the early strength, relies on the synergy between certain characteristics of the cement kiln dust, the hydraulic binder, the metakaolin and the silica fume.

Cement kiln dust (CKD) is a residual by-product material that is generated during the manufacture of cement. This by-product material is a partially calcined kiln feed which contains fine-grained, solid, highly alkaline, unreacted raw materials. Usually, large amounts of cement kiln dust are produced during the manufacturing of cement. Cement kiln dust differs from cement in that the raw material has not been fully burnt. Therefore, because much of the cement kiln dust is actually unreacted raw materials, large amounts of it can be, and are, recycled back into the production process. Some cement kiln dust can be reused directly, while some requires treatment prior to reuse. Cement kiln dust that is not returned to the production process or used elsewhere is disposed in landfills or waste piles, which can add undesirable costs to the manufacture of cement. Thus, it will be appreciated by one skilled in the art that replacement of a portion of the cement employed in a cementitious composition by an otherwise by-product material which presents a disposal problem, is beneficial for the environment.

During the production of cement clinker, cement kiln dust is carried by hot gasses in a cement kiln and collected by a filter system. The filter system can include electrostatic precipitators or baghouses to recover the cement kiln dust. Electrostatic precipitators use an electrical field to remove the particles. Baghouses use high temperature filters such as, for example, fiberglass filters, to collect the cement kiln dust. The chemical analysis of cement kiln dust from various cement manufacturers varies depending on a number of factors, including the particular kiln feed, the mode of operation of the kiln, the efficiencies of the cement production operation, and the associated filter systems. Cement kiln dust collected by the filter system of the cement plant generally includes a variety of oxides, such as $SiO_2$, $Al_2O_3$, $Fe_2O_3$, CaO, MgO, $SO_3$, $Na_2O$, and $K_2O$ and other components like free lime and chlorides.

The inventors have devised that by incorporating cement kiln dust having selected ingredients in a predefined amount in the cementitious binder, it is possible to significantly enhance the performances of low density settable cementitious compositions without using, or using reduced amounts, of lightweight additives. In addition, the inventors have devised that the use of such cement kiln dust in combination with additional materials including metakaolin, a hydraulic binder and silica fume in predefined amounts by weight of the cementitious binder also significantly enhances the performances of low density settable cementitious compositions. The performances of low density settable cementitious compositions, as defined herein, include, for example, rapid high compressive strength at 24 h (i.e. at least 500 psi at 100 F for a cementitious settable composition having a density lower than about 13 ppg) without using, or including a minimum amount of, lightweight additives such as microspheres, foaming agents or the like. In the following embodiments discussed hereinafter, compressive strength measurements (at 24 hours, 100 F and 72 hours, 140 F) are performed in accordance with the standard defined by API Specification 10A, Sec 7, 9.

It has been found that cementitious binder compositions comprising cement kiln dust in an amount of at least 10% by weight of the cementitious binder, preferably between about 15-28% by weight of the cementitious binder, the cement kiln dust including at least chlorine in an amount of at least 0.1% to about 5% by weight of the cement kiln dust, preferably between about 1-4% by weight of the cement kiln dust, and/or sulfates in an amount of at least 4% by weight of the cement kiln dust and/or free lime in an amount of at least 1% by weight of the cement kiln dust, significantly enhance the performances of low density settable cementitious compositions. It has been found that chlorine, sulfate and free lime in the cement kiln dust enhance early age properties of the cementitious composition including strength and expansion. For example, it has been found that chlorine and sulfate in the cement kiln dust could beneficially act as a cement or cementitious activator and accelerate the strength development of low density cementitious settable compositions. Further, it has been found that free lime in the cement kiln dust beneficially prevents shrinkage of low density settable cementitious compositions.

One skilled in the art will appreciate that the acceleration of strength development and reduced shrinkage of the settable cementitious composition is particularly beneficial for low density settable cementitious compositions that are used in subterranean applications. For example, it is desirable that low density settable cementitious compositions used in well bore applications develop early compressive strength to obtain good well bore isolation and/or maintain mechanical integrity of the well bore. In addition, the normal shrinkage of cement can pose problems during cementing in oil and gas wells. Shrinkage can play a major role in the long-term cemented annular isolation. The long term seal of the annulus is jeopardized if the set cement pulls away from the pipe, casing, or from the well bore. It is thus desirable to carefully control shrinkage.

The amount of chlorine, sulfate, alkali, and free lime in the cement kiln dust can be controlled and/or selected in one embodiment of the invention by varying the raw ingredients fed to the kiln assembly. While the raw ingredients fed to the cement kiln typically include a premix of limestone, clay or shale, it will be appreciated that the chemical composition of these ingredients can differ depending on the geographical locations where they are collected. As a result, the constituents, and their relative amounts by weight, in the cement kiln dust can differ depending on the geographical locations where the raw ingredients are collected. In one embodiment, the raw materials, proportion targets and fineness targets are modified to obtain the mineralogy and chemical composition.

In another embodiment, the amount of chlorine, sulfate, alkali and free lime in the cement kiln dust can be controlled by modifying the geometry of the cement kiln to process the cement raw ingredients. For example, it has been found that pre-calcining cement kilns provide a cement kiln dust having greater amounts of free lime than those generated by long dry cement kilns.

In yet another embodiment of the invention, the amount of chlorine and sulfate in the cement kiln dust can be controlled by changing the type of fuels and raw materials that are used in the burner assembly of the cement kiln. This can be accomplished, for example, by using high or low sulfur coal, and/or by adjusting the amount of petroleum coke, and/or by using alternate fuels such as waste oils and plastic. In one embodiment, burning conditions are modified to produce a specific clinker with a specific mineralogy. Further, it has been found that the process parameters in the burning zone, fuels and cooler operation can be adjusted to produce the desired results.

In yet another embodiment of the invention, the amount of chlorine and sulfate in the cement kiln dust can be controlled by the dust filter system or by selectively purging the dust system. For example, it has been found that the content of chlorine and sulfate can significantly vary in the cement kiln dust depending on the location where the dust is collected in the filter system when an electrostatic precipitator is used. In yet another embodiment of the invention, the amount of chlorine and sulfate in the cement kiln dust can be controlled by selectively collecting the dust according to predetermined kiln burning conditions. For example it is known that volatilization of these elements are affected by kiln burning zone conditions which affect the chemistry of the cement kiln dust. Timing of cement kiln dust collection according to certain kiln burning conditions would assure a preferred chloride and sulfate content.

In one embodiment, a slipstream line production (or bypass CKD) is used to collect the cement kiln dust. In this process, ultra fine particles of CaO are entrained in the combustion gas stream of the cement kiln and are withdrawn from the process along with volatiles of chlorine, sulfur, potassium and sodium. The amount of calcination is controlled by the temperature limits within the process. These manufactured by-product materials are withdrawn as a specifically managed manufactured event. With this process, it is possible to control the content of chlorine and sulfate in the cement kiln dust.

For the purpose of illustration, Table 1 shows the chemical analysis of cement kiln dust generated by three different cement plants (CKD site 1 plant, CKD site 2 plant and CKD site 3 plant) that manufacture cement with three different cement kilns (pre-calcining cement kiln at the site 2 plant, long dry cement kiln at the site 1 plant and long wet cement kiln at site 3). In Table 1, some of the materials present in the cement kiln dust are given.

TABLE 1

| | CKD Site 1 | CKD Site 2 | CKD Site 3 |
|---|---|---|---|
| $SiO_2$ | 13.16 | 13.98 | 14.54 |
| $Al_2O_3$ | 2.14 | 4.03 | 3.4 |
| $Fe_2O_3$ | 2.43 | 2.17 | 1.57 |
| CaO | 47.42 | 65.9 | 28.5 |
| MgO | 1.91 | 1.63 | 1.45 |
| $SO_3$ | 6.86 | 4.28 | 9.44 |
| $Na_2O$ | 0.14 | 0.32 | 1.8 |

TABLE 1-continued

| | CKD Site 1 | CKD Site 2 | CKD Site 3 |
|---|---|---|---|
| $K_2O$ | 0.78 | 1.13 | 12.2 |
| $P_2O_5$ | 0.08 | 0.1 | 0.07 |
| $TiO_2$ | 0.15 | 0.26 | 0.68 |
| Alkalies | 0.65 | 1.07 | 9.83 |
| Chlorine | 0.08 | 2.4 | 7.43 |
| Free Lime | 8.45 | 44.8 | 1.43 |
| $Na_2Oeq$ | 0.65 | 1.06 | 9.82 |

As can be seen in Table 1, the content of chlorine, sulfate and free lime can vary significantly depending on how the kiln operates and the location where the ingredients of the premix are collected (CKD site 1 or CKD site 2 or CKD site 3) and the type of cement kiln that is used to manufacture the cement. For example, an amount of chlorine in the cement kiln dust of site 1 that is greater than 0.08%, for example greater than 0.1%, could be obtained by changing the parameters of the cement kiln of site 1 (e.g. modifying the type of fuel or raw materials used in the burner assembly and/or controlling the extraction of the cement kiln dust) in CKD site 1. The content of chlorine and free lime in the cement kiln dust produced at sites 2 and 3 are significantly greater than those in the cement kiln dust produced at site 1. Conversely, the content of sulfate is greater in the cement kiln dust produced at site 1 than at site 2. In one embodiment of the invention, the cement kiln dust is selected in the cementitious binder based on its content of chlorine and/or sulfate and/or free lime. The cement kiln dust should be selected and added in the cementitious binder to provide the desired compressive strength and/or density.

In accordance with one embodiment of the invention, the cementitious binder includes cement kiln dust in an amount of at least 10% by weight of the cementitious binder, when added with water, that has a density lower than about 12 pounds per gallon and a 24 hour compressive strength at 100 F, as hardened, of at least 500 psi without using lightweight additives such as microspheres, foaming agents or the like. Preferably, in one embodiment, the cement kiln dust is present in the cementitious binder in an amount in the range of from about 15 to 28% by weight of the cementitious binder. More preferably, in one embodiment, chlorine is present in the cement kiln dust in an amount in the range of from about 1% to 4% by weight of the cement kiln dust.

The cementitious binder, according to one embodiment of the invention, may further include a hydraulic binder. Examples of hydraulic binders that could be used in embodiments of the invention are, but not limited to, Portland cements, blended cements, masonry cements compliant with ASTM and/or AASHTO specifications as well as API compliant cements. The inventors have devised that the high fineness of some cements enhance water retention and strength development of the cementitious settable composition. It is desirable to control the amount of hydraulic binder in the cementitious binder to achieve early high compressive strength for low density cementitious settable compositions.

Preferably, in one embodiment of the invention, the cementitious binder further includes metakaolin in an amount in the range of from about 1 to 30% by weight of the cementitious binder. Preferably, in one embodiment of the invention, metakaolin is present in the cementitious binder in an amount in the range of from about 8 to 25% by weight of the cementitious binder. More preferably, in one embodiment of the invention, metakaolin is present in the cementitious binder in an amount in the range of from about 8 to 18% by weight of the cementitious binder.

Metakaolin acts as a pozzolanic material in the cementitious binder and should preferably have an average particle size lower than about 3 μm, preferably lower than about 1.7 μm. A pozzolanic material is a siliceous or aluminosiliceous material that possesses little or no cementitious value, but will, in the presence of water and in finely divided form, chemically react with the calcium hydroxide produced during the hydration of Portland cement to form materials with cementitious properties. It has been found that cementitious binders including metakaolin, which has a small particle size, significantly enhance the early compressive strength of cementitious settable compositions having a density lower than about 13 ppg, preferably lower than 10 ppg.

Further, it has been found that some metakaolins are more reactive than others and are, therefore, greatly beneficial in obtaining early compressive strength, in combination with cement kiln dust having chlorine in an amount of at least 0.1% by weight of cement kiln dust to prepare low density cementitious compositions without using, or including a minimum amount of, lightweight additives such as microspheres, foaming agents and the like.

In other embodiments of the invention, it is envisioned that other types of pozzolanic materials could be used in addition to or instead of metakaolin.

For example, in one embodiment of the invention, the cementitious binder also includes silica fume in an amount up to about 15% by weight of the cementitious binder. Silica fume is a by-product formed in the production of silicon or ferro-silicon alloys and is collected by filtration of gases leaving the electric arc furnace. Typically it contains at least 75%, by weight, of silicon dioxide and consists of very fine spherical particles less than about 0.1 μm. It has been determined that, due to its very high surface area, a small amount of silica fume was beneficial in obtaining cementitious settable compositions having low free fluid and segregation. In addition, it has been determined that high surface area materials such as silica fume and diatomaceous earth produce synergistic effects with other ultra fine materials that enhance early (e.g. 24 h) compressive strengths for low density cementitious settable compositions.

In another embodiment of the invention, the cementitious binder includes diatomaceous earth in an amount less than about 25% by weight of the cementitious binder. Diatomaceous earth is a siliceous sedimentary mineral compound from microscopic skeletal remains of unicellular algae-like plants called diatoms. Diatomaceous earth mainly includes magnesium, silicon, calcium, sodium, iron and many other trace minerals such as titanium, boron, manganese, copper and zirconium. It has been found that diatomaceous earth and silica fume are greatly beneficial in helping control the properties of the cementitious settable composition (slurry), such as free fluid and segregation, due to their very small particle sizes. The particle size of diatomaceous earth is about 0.1 μm. Thus, the use of a cementitious binder including silica fume and diatomaceous earth is greatly beneficial in subterranean applications.

In yet another embodiment of the invention, the cementitious binder includes rice hull ash, zeolite, fly ash, GGBFS (Ground Granulated Blast Furnace Slag), vitreous expanded shale and pumice in an amount in the range of from about 5 to 30% by weight of the cementitious binder. These materials have been found to provide excellent characteristics in terms of control of shrinkage, early compressive strengths, thickening time, thermal stability and manufacturing cost optimization.

In one embodiment of the invention, the cementitious binder also includes limestone in an amount more than 5% by weight of the cementitious binder. Limestone can be ground very finely in the cement mill. It has been found that limestone can be used as a filler and as a partial replacement for cement kiln dust with the ability to achieve the same benefits as explained above by adding chlorine, sulfate and free lime.

The cementitious binder is prepared in one embodiment of the invention by inter-grinding the various raw materials in a cement mill. As will be appreciated by one skilled in the art, this method should be contrasted with the blending process. Typically, the user of a cementitious binder may add further ingredients to it in order to obtain a cementitious settable composition with desired properties. This is done generally by blending the cementitious binder with the additional materials at the user's field site. In one embodiment, the cement kiln dust, the cement clinker, gypsum and/or one or more additional pozzolanic materials, such as, for example metakaolin, are inter-ground together and provide a cementitious binder that has a an advantageous particle size distribution. Such a system also has a benefit of producing a more consistant product considering cement plant factors such as large volumes of materials at any given time in a milling system; large volume silo storage and continuous quality control on-site. This enhances the strength characteristics of the resulting cementitious settable composition and improves the quality control and product uniformity as compared to the blending process. The resulting cementitious binder is more uniform and more reactive than a similar product that is obtained by merely blending the various raw materials. Further, the resulting cementitious binder can be shipped directly to the customer, thereby bypassing the blending plant. This significantly reduces the preparation costs of cementitious settable compositions. While it is desirable to inter-grind the various materials of the cementitious binder to provide a premix that is directly usable at the user's field site, it is encompassed that in one embodiment of the invention the resulting premix could be blended with additional materials to obtain additional desired properties. For example, in embodiments of the invention, additives, such as, for example, set time modifiers, accelerators, water reducers, super water reducers, fibrous materials (to increase tensile strength) and inorganic materials (to encourage cohesion) could be incorporated into the premix.

The lightweight cementitious settable compositions of embodiments of the invention exhibit enhanced compressive performances at densities lower than about 13 pounds per gallon (ppg) without using, or including a minimum amount of, lightweight additives such as microspheres, foaming agents or the like. In particular, the cementitious binder provides a cementitious settable composition, when only water is added, that has a density lower than about 12 pounds per gallon and a 24 hour compressive strength at 100 F, as hardened, of at least 500 psi. The water used in the cementitious settable compositions of embodiments of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the cementitious settable composition. In some embodiments, the water may be included in an amount sufficient to form a pumpable slurry. In some embodiments, the water may be included in the cementitious settable compositions of embodiments of the present invention in an amount in the range of from about 40% to about 200% by weight. As used herein, the term "by weight," when used herein to refer to the percent of a component in the cementitious settable composition, means by weight included in the cementitious settable compositions of the present invention relative to the weight of the dry components in the cementitious settable composition. In some embodiments, the water may be included in an amount in the range of from about 40% to about 150% by weight.

Cementitious settable compositions of embodiments of the invention having a density lower than about 10 pounds per gallon and a 24 hour compressive strength at 100 F, as hardened, of at least 500 psi can be obtained by using a reduced amount of lightweight additives, such as microspheres. The higher strength and good slurry properties obtained by the cementitious settable composition of this embodiment at 12 ppg and 13 ppg enables slurry density decrease by increasing the water content (while maintaining acceptable slurry properties). A formulation of ultralight cementitious settable composition (e.g. 10 ppg, 9 ppg and 8 ppg) is done by first determining the water content required to achieve a desired compressive strength in a cementitious settable composition without lightweight additives such as microspheres. The required amount of light weight additives (e.g. microspheres) is then calculated to achieve the target weight of the cementitious settable composition. Up to a certain content, the lightweight additives, such as microspheres, are considered as fillers that have minimal impact on water content and rheology and therefore will maintain any designed target strength.

A variety of microspheres may be utilized in accordance with embodiments of the present invention, including hollow, solid, and/or porous microspheres. Suitable microspheres may include a variety of materials, including, but not limited to, microspheres that comprise glass, soda lime borosilicate glass, fly ash, ceramic, polystyrene, other polymeric materials, and mixtures thereof. In some embodiments of the lightweight cementitious settable compositions of the present invention, the microspheres are hollow, glass microspheres. In some embodiments, the microspheres may comprise a crosslinked polymeric material, such as polystyrene crosslinked with divinyl benzene (e.g., plastic beads). The microspheres may be obtained from any suitable source. Examples of suitable fly ash microspheres are commercially available from Halliburton Energy Services, Inc., Duncan, Okla., under the tradename SPHERELITE™ microspheres. Suitable hollow, soda lime borosilicate glass microspheres include 3M™ SCOTCHLITE™ glass bubbles. In a preferred embodiment, borosilicate glass microspheres (3M™ beads) produced by the 3M™ company can be beneficially used to produce lightweight cementitious settable compositions that produce enhanced 24 h compressing strengths In one embodiment of the invention, the microspheres may be added in the cement finish mill, in the cement separator, in the cement cooler or by using a separate blender from the cement grinding operation. In these embodiments, the resulting premix would include microspheres before being delivered to the user. Alternatively, in another embodiment, microspheres may be blended with the cementitious binder/premix by the user to further lower the density of the cementitious settable composition, for example, to obtain a density lower than about 10 ppg, or lower than about 9 ppg (for example about 8 ppg).

It is envisioned in one embodiment of the invention to foam the cementitious settable composition with a gas to further lower its density. The gas used in the foamed settable compositions according to embodiments of the present invention may be any gas suitable for foaming a settable composition, including, but not limited to, air, nitrogen, or combinations thereof. Generally, the gas should be present in the foamed cementitious settable compositions according to embodiments of the present invention in an amount sufficient to form the desired foam. The cementitious settable compositions of embodiments of the present invention further include a surfactant. In some embodiments, the surfactant includes a foaming and stabilizing surfactant composition to facilitate the foaming of a cementitious settable composition and to stabilize the resultant foamed cementitious settable composition formed therewith. Any suitable foaming and stabilizing surfactant composition may be used in the cementitious settable compositions according to embodiments of the present invention.

Embodiments of the present invention will be further illustrated in more detail using the following, but not limitative, examples. A series of sample settable cementitious compositions were prepared at room temperature and subjected to 24 hour compressive strength tests at 100 F and 72 hour compressive strength tests at 140 F. Some examples also provide thickening time (API 10A) measurements.

Example 1

Referring to Table 2, this table shows the impact of cement kiln dust's chlorine content on the 24 h compressive strength of various low density cementitious settable compositions cured at 100 F. Results are provided for various densities (12 ppg and 13 ppg), various amounts of Portland cement (OPC), various amounts of metakaolin, various amounts of silica fume and various types of cement kiln dusts, namely CKD site 1 having a chlorine content of 0.08% by weight of cement kiln dust, CKD site 2 having a chlorine content of 2.4% by weight of cement kiln dust, and a two blends of CKD site 1 and CKD site 3 designed to achieve a chlorine content of 1.5% and 5%. It will be appreciated that the low density cementitious settable compositions of Table 2 were obtained without using lightweight additives such as microspheres, foaming agents or the like.

As can be seen in Table 2, the amount of chlorine in the cement kiln dust significantly impacts the compressive strength of the cementitious settable compositions. For example, Table 2 shows that for a given amount of metakaolin and Portland cement, the cement kiln dust of site 2 (corresponding to a chlorine content of about 2.4%) significantly increases, and in some cases doubles, the 24 h compressive strength of the cementitious settable compositions with a density of 12 ppg. Similar results are obtained for cementitious settable compositions with a density of 13 ppg. Table 2 also shows that amounts of chlorine greater than 2.4% by weight of cement kiln dust (e.g. a blend of CKD site 1 and CKD site 3 providing a chlorine amount of about 5%), do not significantly enhance the 24 h compressive strength further. In addition, Table 2 shows that the compressive strength obtained with compositions including CKD site 1 can be increased by adding an amount of calcium chloride to the composition (see, for example, samples 15 and 18 that include $CaCl_2$ as an additive to raise the chlorine concentration to the same level as that of CKD site 2). However, it will be appreciated that such addition might not be sufficient to obtain 24 h compressive strength results that are the same as those obtained with compositions including CKD site 2 (compare, for example, samples 15 and 13 and samples 18 and 16). The results of Table 2 indicate that the amount of chlorine in the cement kiln dust in the cementitious settable composition greatly impacts the compressive strength of low density compositions. In particular, the 24 h compressive strength of low density cementitious settable compositions (i.e. lower than about 13 ppg) can be significantly enhanced by using cement kiln dust having an amount of chlorine greater than 0.1% by weight of the cement kiln dust. As a result, the low density cementitious settable compositions can be prepared without using, or using little amounts of, lightweight additives. Preferably, in an embodiment, the amount of chlorine in the low density cementitious settable composition is between 1 and 4% by weight of the cement kiln dust.

TABLE 2

| Sample | Density Ppg | OPC Type III (% by weight) | CKD site 1 (% by weight) | CKD site 2 (% by weight) | CKD site 3 (% by weight) | Metakaolin (% by weight) | Silica Fume (% by weight) | $CaCl_2$ (% by weight) | 24 h strength 100 F. | 72 h strength 140 F. |
|---|---|---|---|---|---|---|---|---|---|---|
| 1 | 11 | 62 | | 23 | | 12 | 3 | | 827 | |
| 2 | 12 | 59 | 23 | | | 18 | 0 | | 686 | |
| 3 | 12 | 59 | | 23 | | 18 | 0 | | 1263 | |
| 4 | 11 | 59 | 7.6 | | 15.4 | 18 | 0 | | 1152 | |
| 5 | 12 | 59 | 18.4 | | 4.6 | 18 | 0 | | 1070 | |
| 6 | 12 | 62 | 23 | | | 15 | 0 | | 596 | |
| 7 | 12 | 62 | | 23 | | 15 | 0 | | 1073 | |
| 8 | 12 | 65 | 23 | | | 12 | 0 | | 533 | |
| 9 | 12 | 65 | | 23 | | 12 | 0 | | 782 | |
| 10 | 11 | 65 | 7.6 | | 15.4 | 12 | 0 | | 855 | |
| 11 | 12 | 62 | | 23 | | 12 | 3 | | 955 | 1298 |
| 12 | 11 | 62 | 7.6 | | 15.4 | 12 | 3 | | 931 | |
| 13 | 13 | 68 | | 23 | | 9 | 0 | | 2106 | |
| 14 | 13 | 68 | 23 | | | 9 | 0 | | 1435 | |
| 15 | 13 | 68 | 22 | | | 9 | 0 | 1 | 1754 | |
| 16 | 13 | 59 | | 23 | | 18 | 0 | | 3221 | |
| 17 | 13 | 59 | 23 | | | 18 | 0 | | 2177 | |
| 18 | 13 | 59 | 22 | | | 18 | 0 | 1 | 3017 | |

Example 2

Referring now to Table 3, this table shows the impact of the amount of cement kiln dust on the 24 h compressive strength of various cementitious settable compositions cured at 100 F including Portland cement (OPC), metakaolin and optionally silica fume. The compositions were prepared without using lightweight additives such as microspheres, foaming agents and the like.

TABLE 3

| Sample | Density ppg | OPC Type III (% by weight) | CKD (% by weight) | Metakaolin (% by weight) | Silica Fume (% by weight) | 24 h strength 100 F. | 72 h strength 140 F. |
|---|---|---|---|---|---|---|---|
| 19 | 12 | 72 | 10 | 18 | 0 | 944 | |
| 20 | 12 | 69 | 13 | 18 | 0 | 956 | |
| 21 | 12 | 64 | 18 | 18 | 0 | 1018 | |
| 22 | 12 | 59 | 23 | 18 | 0 | 1106 | |
| 23 | 12 | 54 | 28 | 18 | 0 | 1146 | |
| 24 | 12 | 75 | 10 | 3 | 12 | 700 | |
| 25 | 12 | 62 | 23 | 3 | 12 | 955 | 1298 |
| 26 | 12 | 45 | 40 | 3 | 12 | 799 | |
| 27 | 12 | 40 | 45 | 3 | 12 | 754 | |

As can be seen in Table 3, the use of cement kiln dust provides low density cementitious settable compositions of 12 ppg having a 24 h compressive strength greater than about 750 psi and even greater than about 1100 psi without using lightweight additives such as microspheres, foaming agents and the like.

Example 3

Referring to Table 4, this table shows the impact of the amount of Portland cement (OPC) on the 24 h compressive strength of various low density cementitious settable compositions cured at 100 F. In Table 4, the ratio of Portland cement/cement kiln dust is varied for a fixed amount of metakaolin and optionally silica fume. The compositions were prepared without using lightweight additives such as microspheres, foaming agents and the like.

TABLE 4

| Sample | Density ppg | OPC Type III (% by weight) | CKD (% by weight) | Silica Fume (% by weight) | Metakaolin (% by weight) | 24 h strength 100 F. | 72 h strength 140 F. |
|---|---|---|---|---|---|---|---|
| 28 | 12 | 40 | 45 | 3 | 12 | 754 | |
| 29 | 12 | 45 | 40 | 3 | 12 | 799 | |
| 30 | 12 | 62 | 23 | 3 | 12 | 955 | 1298 |

TABLE 4-continued

| Sample | Density ppg | OPC Type III (% by weight) | CKD (% by weight) | Silica Fume (% by weight) | Metakaolin (% by weight) | 24 h strength 100 F. | 72 h strength 140 F. |
|---|---|---|---|---|---|---|---|
| 31 | 12 | 75 | 10 | 3 | 12 | 700 | |
| 32 | 12 | 40 | 42 | 0 | 18 | 914 | |
| 33 | 12 | 45 | 37 | 0 | 18 | 1039 | |
| 34 | 12 | 54 | 28 | 0 | 18 | 1146 | |
| 35 | 12 | 59 | 23 | 0 | 18 | 1106 | |
| 36 | 12 | 64 | 18 | 0 | 18 | 1018 | |
| 37 | 12 | 69 | 13 | 0 | 18 | 956 | |
| 38 | 12 | 72 | 10 | 0 | 18 | 944 | |

As can be seen in Table 4, for a fixed amount of metakaolin and optionally silica fume, a cementitious binder including Portland cement in an amount in a range between about 45-75% by weight of the cementitious binder provides a low density cementitious settable composition having a high 24 h compressive strength. Preferably, in one embodiment, the cementitious binder includes Portland cement in an amount in a range between about 50-65%.

Example 4

Referring to Table 5, this table shows the impact of the type or the source of Portland cement (OPC) on the 24 h compressive strength of various low density cementitious settable compositions cured at 100 F. In Table 5, the ratio of cement/cement kiln dust is varied for a fixed amount of silica fume. The compositions were prepared without using lightweight additives such as microspheres, foaming agents and the like.

TABLE 5

| Density, ppg | Cement Type | OPC (% by weight) | CKD site 1 (% by weight) | Silica Fume (% by weight) | 24 h strength 100 F. (psi) |
|---|---|---|---|---|---|
| 39 | Type III source 1 | 74 | 17 | 9 | 848 |
| 40 | Type III source 2 | 74 | 17 | 9 | 1022 |
| 41 | Type I | 74 | 17 | 9 | 705 |
| 42 | Type III source 1 | 68 | 23 | 9 | 757 |
| 43 | Type III source 2 | 68 | 23 | 9 | 890 |
| 44 | Type I | 68 | 23 | 9 | 595 |
| 45 | Type III source 2 | 63 | 28 | 9 | 788 |
| 46 | Type I | 63 | 28 | 9 | 537 |
| 47 | Type III source 2 | 59 | 33 | 9 | 111 |
| 48 | Type I | 59 | 33 | 9 | 533 |

Example 5

Table 6 shows the impact of the amount of metakaolin on the 24 h compressive strength of various low density cementitious settable compositions (12 ppg and 13 ppg) cured at 100 F including Portland cement (OPC), cement kiln dust and optionally silica fume. In Table 6, the amount of metakaolin is varied for a fixed amount of cement kiln dust at CKD site 1 and CKD site 2. The compositions were prepared without using lightweight additives such as microspheres, foaming agents and the like.

TABLE 6

| Sample | Density, ppg | OPC Type III (% by weight) | CKD site 1 (% by weight) | CKD site 2 (% by weight) | Silica Fume (% by weight) | Metakaolin (% by weight) | 24 h strength 100 F. |
|---|---|---|---|---|---|---|---|
| 49 | 12 | 59 | 23 | | 0 | 18 | 686 |
| 50 | 12 | 62 | 23 | | 0 | 15 | 596 |
| 51 | 12 | 65 | 23 | | 0 | 12 | 533 |
| 52 | 12 | 59 | | 23 | 0 | 18 | 1263 |
| 53 | 12 | 62 | | 23 | 0 | 15 | 1073 |
| 54 | 12 | 65 | | 23 | 0 | 12 | 782 |
| 55 | 12 | 59 | | 23 | 5 | 13 | 999 |
| 56 | 12 | 59 | | 23 | 7 | 11 | 969 |
| 57 | 12 | 59 | | 23 | 9 | 9 | 955 |
| 58 | 13 | 59 | | 23 | 0 | 18 | 2177 |
| 59 | 13 | 62 | | 23 | 0 | 15 | 1780 |
| 60 | 13 | 65 | | 23 | 0 | 12 | 1670 |
| 61 | 13 | 68 | | 23 | 0 | 9 | 1435 |

As can be seen in Table 6, higher amounts of metakaolin in the cementitious binder provide higher 24 h compressive strengths. It will also be appreciated that compositions prepared with the cement kiln dust of CKD site 2, which includes a higher content of chlorine than that of CKD site 1, provide cementitious settable compositions exhibiting higher 24 h compressive strengths.

Example 6

Table 7 shows the impact of the type of metakaolin on the 24 h compressive strength of various low density cementitious settable compositions (13 ppg, 12 ppg and 10 ppg) cured at 100 F including Portland cement (OPC) and optionally silica fume. In Table 6, the amount of various metakaolins is varied for a fixed amount of cement kiln dust at CKD site 2. Lightweight additives (microspheres) were used to prepare cementitious settable compositions at 10 ppg. The compositions at 13 ppg and 12 ppg were prepared without using lightweight additives such as microspheres, foaming agents and the like.

As can be seen in Table 7, the type of metakaolin significantly impacts the early compressive strengths of the cementitious settable compositions regardless of the density of the cementitious settable compositions. It has been found that the source of metakaolin impacts the performance of the settable composition. Metakaolin from source 1 appears to be more reactive than metakaolin from sources 2, 3 and 4. In one embodiment of the invention, the cementitious binder includes metakaolin in an amount greater than 5% by weight of the cementitious binder. In another embodiment of the invention, the cementitious binder includes metakaolin in an amount between about 8-25% by weight of the cementitious binder. In yet another embodiment of the invention, the cementitious binder includes metakaolin in an amount between about 8-18% by weight of the cementitious binder.

Example 7

Table 8 shows the impact of the amount of silica fume on the 24 h compressive strength of various low density cementitious settable compositions (13 ppg and 12 ppg) cured at 100 F including Portland cement (OPC), metakaolin and cement kiln dust. In Table 8, the relative amount of metakaolin and silica fume is varied for a fixed amount of cement kiln dust at CKD site 2 and Portland cement (OPC). The compositions were prepared without using lightweight additives such as microspheres, foaming agents and the like.

TABLE 8

| Sample | Density ppg | OPC Type III (% by weight) | CKD site 2 (% by weight) | Silica Fume (% by weight) | Metakaolin Source 1 (% by weight) | 24 h strength 100 F. |
|---|---|---|---|---|---|---|
| 85 | 12 | 59 | 23 | 0 | 18 | 1263 |
| 86 | 12 | 59 | 23 | 5 | 13 | 999 |
| 87 | 12 | 59 | 23 | 7 | 11 | 969 |
| 88 | 12 | 59 | 23 | 9 | 9 | 955 |
| 89 | 12 | 62 | 23 | 0 | 15 | 1073 |
| 90 | 11 | 62 | 23 | 3 | 12 | 827 |
| 91 | 12 | 62 | 23 | 5 | 10 | 831 |
| 92 | 12 | 65 | 23 | 0 | 12 | 782 |
| 93 | 13 | 68 | 23 | 9 | 0 | 890 |
| 94 | 13 | 65 | 23 | 12 | 0 | 936 |
| 95 | 13 | 62 | 23 | 15 | 0 | 968 |
| 96 | 13 | 59 | 23 | 18 | 0 | 950 |

As can be seen in Table 8, the use of silica fume as a partial substitute for metakaolin only slightly reduces the compressive performances of the cementitious settable compositions. In one embodiment of the invention, the cementitious binder includes silica fume in an amount up to about 15%.

TABLE 7

| Sample | Density ppg | OPC Type III (% by weight) | CKD site 2 (% by weight) | Silica Fume (% by weight) | Metakaolin Source 1 (% by weight) | Metakaolin Source 2 (% by weight) | Metakaolin Source 3 (% by weight) | Metakaolin Source 4 (% by weight) | Microspheres (% by weight of cementitious binder including microspheres) | 24 h strength 100 F. |
|---|---|---|---|---|---|---|---|---|---|---|
| 62 | 13 | 68 | 23 | 0 | 9 | | | | | 1435 |
| 63 | 13 | 68 | 23 | | | 9 | | | | 1264 |
| 64 | 13 | 68 | 23 | | | | 9 | | | 853 |
| 65 | 13 | 65 | 23 | 0 | 12 | | | | | 1670 |
| 66 | 13 | 65 | 23 | | | 12 | | | | 1443 |
| 67 | 13 | 65 | 23 | | | | 12 | | | 908 |
| 68 | 13 | 62 | 23 | 0 | 15 | | | | | 1780 |
| 69 | 13 | 62 | 23 | | | 15 | | | | 969 |
| 70 | 13 | 59 | 23 | 0 | 18 | | | | | 2177 |
| 71 | 13 | 59 | 23 | | | 18 | | | | 1513 |
| 72 | 13 | 59 | 23 | | | | 18 | | | 971 |
| 73 | 11 | 62 | 23 | 0 | 15 | | | | | 827 |
| 74 | 12 | 62 | 23 | 0 | | 15 | | | | 848 |
| 75 | 12 | 62 | 23 | 0 | | | | 15 | | 324 |
| 76 | 12 | 62 | 23 | 3 | 12 | | | | | 788 |
| 77 | 12 | 62 | 23 | 3 | | 12 | | | | 758 |
| 78 | 12 | 62 | 23 | 3 | | | 12 | | | 357 |
| 79 | 12 | 62 | 20 | 6 | 12 | | | | | 878 |
| 80 | 12 | 62 | 20 | 6 | | 12 | | | | 819 |
| 81 | 12 | 62 | 20 | 6 | | | 12 | | | 361 |
| 82 | 10 | 62 | 23 | 3 | 12 | | | | 16 | 1282 |
| 83 | 10 | 62 | 23 | 3 | | 12 | | | 15.6 | 1037 |
| 84 | 10 | 62 | 23 | 3 | | | 12 | | 16.1 | 890 |

Example 8

Table 9 shows the impact of the amount of different pozzolanic materials (high grade metakaolin, silica fume, diatomaceous earth, fly ash, rice hull ash, zeolite and pumice grout) on the 24 h compressive strength of various low density cementitious settable compositions (13 ppg and 10 ppg) cured at 100 F. In Table 9, the amount of the different pozzolanic materials is varied for a fixed amount of cement kiln dust at CKD site 2 and Portland cement.

The compositions at 13 ppg were prepared without using lightweight additives such as microspheres, foaming agents and the like.

TABLE 9

| Sample | Density ppg | OPC Type III (% by weight) | CKD site 2 (% by weight) | CKD site 1 (% by weight) | Silica Fume (% by weight) | Metakaolin Source 1 (% by weight) | Diatomaceous Earth (% by weight) |
|---|---|---|---|---|---|---|---|
| 97 | 13 | 68 | 23 | | 0 | 9 | |
| 98 | 13 | 65 | 23 | | 0 | 12 | |
| 99 | 13 | 62 | 23 | | 0 | 15 | |
| 100 | 13 | 59 | 23 | | 0 | 18 | |
| 101 | 13 | 68 | 23 | | 0 | | 9 |
| 102 | 13 | 65 | 23 | | 0 | | 12 |
| 103 | 13 | 62 | 23 | | 0 | | 15 |
| 104 | 13 | 59 | 23 | | 0 | | 18 |
| 105 | 13 | 68 | 23 | | 0 | | |
| 106 | 13 | 65 | 23 | | 0 | | |
| 107 | 13 | 62 | 23 | | 0 | | |
| 108 | 13 | 59 | 23 | | 0 | | |
| 109 | 13 | 68 | 23 | | 0 | | |
| 110 | 13 | 65 | 23 | | 0 | | |
| 111 | 13 | 62 | 23 | | 0 | | |
| 112 | 13 | 59 | 23 | | 0 | | |
| 113 | 13 | 68 | 23 | | 0 | | |
| 114 | 13 | 65 | 23 | | 0 | | |
| 115 | 13 | 62 | 23 | | 0 | | |
| 116 | 13 | 59 | 23 | | 0 | | |
| 117 | 13 | 59 | 23 | | 9 | 9 | |
| 118 | 13 | 59 | 23 | | 9 | | |
| 119 | 13 | 62 | 23 | | 4 | | |
| 120 | 10 | 59 | 23 | | 0 | 13 | 5 |
| 121 | 10 | 59 | 23 | | 0 | 11 | 7 |
| 122 | 10 | 59 | 23 | | 0 | 9 | 9 |
| 123 | 10 | 59 | | 18 | 0 | 18 | 5 |

| Sample | Fly Ash (% by weight) | Ultrafine Fly Ash (% by weight) | Zeolite (% by weight) | Pumice Grout | Microspheres (% by weight cementitious binder including microspheres) | 24 h strength 100 F. |
|---|---|---|---|---|---|---|
| 97 | | | | | | 1435 |
| 98 | | | | | | 1670 |
| 99 | | | | | | 1780 |
| 100 | | | | | | 2177 |
| 101 | | | | | | 974 |
| 102 | | | | | | 1029 |
| 103 | | | | | | 1050 |
| 104 | | | | | | 1086 |
| 105 | 9 | | | | | 735 |
| 106 | 12 | | | | | 818 |
| 107 | 15 | | | | | 802 |
| 108 | 18 | | | | | 710 |
| 109 | | 9 | | | | 803 |
| 110 | | 12 | | | | 681 |
| 111 | | 15 | | | | 678 |
| 112 | | 18 | | | | 551 |
| 113 | | | 9 | | | 682 |
| 114 | | | 12 | | | 660 |
| 115 | | | 15 | | | 598 |
| 116 | | | | 18 | | 376 |
| 117 | | | | | | 1429 |
| 118 | | | 9 | | | 948 |
| 119 | | | 11 | | | 784 |
| 120 | | | | | 13.3 | 825 |
| 121 | | | | | 13.2 | 744 |
| 122 | | | | | 13.3 | 707 |
| 123 | | | | | 14.2 | 874 |

As can be seen in Table 9, metakaolin gives the highest 24 h compressive strength. Diatomaceous earth and silica fumes have similar performance but exhibit a lower 24 h compressive strength than metakaolin from source 1. Rice hull ash, zeolite, ultra fine fly ash and pumice grout provide cementitious settable compositions that have much lower compressive strengths.

Example 9

Table 10 shows the impact of the amount of limestone and other pozzolanic materials (metakaolin from source 1, silica fume, diatomaceous earth, ground expanded shale, ASTM class F and class C fly ash and pumice grout) on the 24 h compressive strength of various low density cementitious settable compositions (13 ppg and 12 ppg) cured at 100 F including Portland cement (OPC), metakaolin and optionally cement kiln dust. The compositions were prepared without using lightweight additives such as microspheres, foaming agents and the like.

As can be seen in Table 10, metakaolin from source 1 gives the highest 24 h compressive strength. Limestone, diatomaceous earth and silica fumes have similar performance but exhibit a lower 24 h compressive strength than metakaolin. A blend of diatomaceous earth and metakaolin increases the strength. Ground expanded shale, ground pumice, ASTM class F and class C fly ash provide cementitious settable compositions that have much lower compressive strengths.

TABLE 10

| Sample | Density ppg | OPC Type III (% by weight) | CKD site 2 (% by weight) | Silica Fume (% by weight) | Metakaolin Source 1 (% by weight) | Limestone (% by weight) | Diatomaceous Earth (% by weight) | Ground Expanded Shale (% by weight) | Ground Pumice (% by weight) | Class F Fly Ash (% by weight) | Class C Fly Ash (% by weight) | 24 h strength 100 F. |
|---|---|---|---|---|---|---|---|---|---|---|---|---|
| 124 | 12 | 62 | 23 | 3 | 12 | 0 | | | | | | 955 |
| 125 | 12 | 62 | 15 | 3 | 12 | 8 | | | | | | 833 |
| 126 | 12 | 62 | 8 | 3 | 12 | 15 | | | | | | 678 |
| 127 | 13 | 68 | | | 9 | 23 | | | | | | 1278 |
| 128 | 13 | 59 | | | 18 | 23 | | | | | | 1555 |
| 129 | 13 | 59 | | | 18 | | 23 | | | | | 1168 |
| 130 | 13 | 59 | 11 | | 18 | | 12 | | | | | 3017 |
| 131 | 13 | 59 | | | 18 | | | 23 | | | | 1491 |
| 132 | 13 | 59 | | | 18 | | | | 23 | | | 1059 |
| 133 | 13 | 59 | | | 18 | | | | | 23 | | 1062 |
| 134 | 13 | 59 | | | 18 | | | | | | 23 | 902 |

Example 10

Table 11 shows the impact of microspheres (e.g. glass beads) on the 24 h compressive strength of various low density cementitious settable compositions (12 ppg, 10 ppg and 8 ppg) cured at 100 F including Portland cement (OPC), metakaolin and optionally silica fume and diatomaceous earth. In Table 11, the amount of the different pozzolanic materials is varied for a fixed amount of cement kiln dust at CKD site 1 and CKD site 2. In Table 11, API 10A Schedule 5 corresponds to the thickening time of cementitious settable compositions. The amount of microspheres in the cementitious binder refers to the weight of microspheres to the weight of the cementitious binder including the microspheres.

TABLE 11

| Sample | Density ppg | OPC Type III (% by weight) | CKD site 1 (% by weight) | CKD site 2 (% by weight) | Silica Fume (% by weight) | Metakaolin Source 1 (% by weight) | Diatomaceous Earth (% by weight) | Microspheres (% by weight cementitious binder including microspheres) | 24 h strength 100 F. (psi) | 72 h strength 140 F. (psi) | API 10A Sch 5 |
|---|---|---|---|---|---|---|---|---|---|---|---|
| 135 | 12 | 59 | 23 | | 0 | 18 | | 0 | 686 | | 80 |
| 136 | 10 | 59 | 23 | | 0 | 18 | | 14.6 | 985 | | 99 |
| 137 | 12 | 62 | 23 | | 0 | 15 | | 0 | 596 | | |
| 138 | 10 | 62 | 23 | | 0 | 15 | | 15.0 | 948 | 2048 | |
| 139 | 12 | 65 | 23 | | 0 | 12 | | 0 | 533 | | |
| 140 | 10 | 65 | 23 | | 0 | 12 | | 15.0 | 856 | | |
| 141 | 12 | 59 | | 23 | 0 | 18 | | 0 | 1263 | | 84 |
| 142 | 10 | 59 | | 23 | 0 | 18 | | 13.5 | 1106 | | |
| 143 | 12 | 59 | | 23 | 5 | 13 | | 0 | 999 | | |
| 144 | 10 | 59 | | 23 | 5 | 13 | | 13.7 | 1051 | 2147 | |
| 145 | 12 | 59 | | 23 | 7 | 11 | | 0 | 969 | | |
| 146 | 10 | 59 | | 23 | 7 | 11 | | 13.9 | 947 | | |
| 147 | 10 | 59 | | 23 | 9 | 9 | | 13.4 | 759 | | |
| 148 | 12 | 62 | | 23 | 0 | 15 | | 0 | 1073 | | |
| 149 | 10 | 62 | | 23 | 0 | 15 | | 13.6 | 1014 | | |
| 150 | 12 | 62 | | 23 | 3 | 12 | | 0 | 1103 | | |

TABLE 11-continued

| Sample | Density ppg | OPC Type III (% by weight) | CKD site 1 (% by weight) | CKD site 2 (% by weight) | Silica Fume (% by weight) | Metakaolin Source 1 (% by weight) | Diatomaceous Earth (% by weight) | Microspheres (% by weight cementitious binder including microspheres) | 24 h strength 100 F. (psi) | 72 h strength 140 F. (psi) | API 10A Sch 5 |
|---|---|---|---|---|---|---|---|---|---|---|---|
| 151 | 10 | 62 |  | 23 | 3 | 12 |  | 14.1 | 978 | 2338 | 93 |
| 152 | 10 | 62 |  | 23 | 4 | 11 |  | 14.2 | 1069 |  |  |
| 153 | 10 | 62 |  | 23 | 6 | 9 |  | 14.3 | 1066 |  |  |
| 154 | 12 | 65 |  | 23 | 0 | 12 |  | 0 | 782 |  |  |
| 155 | 10 | 65 |  | 23 | 0 | 12 |  | 13.5 | 787 |  |  |
| 156 | 10 | 65 |  | 23 | 3 | 9 |  | 13.8 | 684 |  |  |
| 157 | 10 | 59 |  | 23 |  | 13 | 5 | 13.3 | 825 |  |  |
| 158 | 10 | 59 |  | 23 |  | 11 | 7 | 13.2 | 744 |  |  |
| 159 | 10 | 59 |  | 23 |  | 9 | 9 | 13.3 | 707 |  |  |
| 160 | 8 | 62 |  | 23 |  | 12 | 3 | 34.9 | 612 |  | 100 |

As can be seen in Table 11, the use of cement kiln dust including higher contents of chlorine and free lime (CKD site 2 vs. CKD site 1) significantly enhances, and in some instances doubles, the compressive strengths of the cementitious settable composition, as hardened (1263 psi vs. 686 psi), for densities of 12 ppg and 10 ppg. Thus, it will be appreciated that the use of cement kiln dust having a chlorine content of at least 0.1% enhances the strength characteristics of the resulting cementitious settable compositions. The compressive strength of cementitious settable compositions at 10 ppg are similar to those at 12 ppg with the use of a minimum amount of microspheres, i.e. lower than about 16% by weight of the cementitious composition. In addition, the cementitious settable composition according to one embodiment of the invention provides a compressive strength greater than 600 psi (see sample 153) at a density of 8 ppg with an amount of microspheres lower than about 35% by weight of the cementitious composition Comparative Example 1

A low density cementitious settable composition was prepared using a conventional low density cementitious binder with an amount of water of 54% by weight of the cementitious settable composition. Table 12 shows the compressive strength performance obtained with this cementitious binder at 12 ppg.

TABLE 12

|  | Conventional low density cementitious binder |
|---|---|
| Compressive strength (24 h/100 F.) (psi) | 371 |

As can be seen in Table 12, for the same amount of water (54%), the conventional cementitious binder provides cementitious settable composition at 12 ppg having a 24 h compressive strength that is much lower than that obtained with the cementitious binder according to one embodiment (955 psi).

Comparative Example 2

A low density cementitious settable composition was prepared using a conventional low density cementitious binder. Lightweight additives (borosilicate glass beads (3M™ beads) were added to reach a density of 10 ppg. Table 13 shows the compressive strength performance obtained with this conventional cementitious binder at 10 ppg.

TABLE 13

|  | Conventional low density cementitious binder |
|---|---|
| % glass beads added | 20.5 |
| % water | 41 |
| Strength (24 h/100 F.) (psi) | 717 |

As can be seen in Table 13, it is necessary to significantly increase the amount of lightweight additives (over 20%) in the conventional cementitious binder to provide a cementitious settable composition at 10 ppg having a 24 h compressive strength greater than 700 psi. This compressive strength remains lower than that obtained with the cementitious binder according to one embodiment of the invention (see Table 11). The use of additional lightweight additives results in a significant increase in the cost of the cementitious binder as they are the most expensive materials in lightweight cementitious formulations.

The cementitious settable compositions according to embodiments of the invention may be used in a variety of applications. For example, the cementitious settable compositions may be used in primary cementing, remedial cementing, and drilling operations. In accordance with one embodiment of the invention, a method of cementing includes providing a cementitious settable composition that includes water; and a cementitious binder including cement kiln dust in an amount in the range of from about 15 to 25% by weight of the cementitious binder, the cement kiln dust including chlorine in an amount of at least 0.1% by weight of the cement kiln dust, wherein the cementitious settable composition has a density lower than 12 pounds per gallon and a 24 hour compressive strength at 100 F, as hardened, of at least 500 psi. The method further includes introducing the cementitious settable composition into an underground formation.

In accordance with one embodiment of the invention, the cementitious settable composition is introduced in the underground formation in a well bore between a casing and a wall of the well bore to perform primary cementing. In another embodiment, the cementitious settable composition may be introduced in the underground formation to repair the casing and/or to achieve zonal isolation. For example, the cementitious settable composition may be used for purposes including, but not limited to, sealing off perforations, repairing casing leaks (including leaks from damaged areas of the casing), plugging back or sealing off the lower section of a wellbore, and sealing the interior of a wellbore during abandonment operations. Examples of specific applications include, but are not limited to, cementing casing and liner strings, inflatable packers, squeezing perforations and casing leaks.

It is also envisioned in other embodiments of the invention to use the cementitious settable compositions in applications other than subterranean applications. For example, the cementitious settable compositions may be used in construction cementing where compositions having low densities and enhanced compressive strengths are desired.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A manufactured cementitious binder comprising:
   hydraulic binder in an amount in the range of from about 40 to 75% by weight of the cementitious binder;
   metakaolin in an amount of at least 3% by weight of the cementitious binder;
   silica fume in an amount up to about 15% by weight of the cementitious binder; and
   cement kiln dust in an amount of at least 10% by weight of the cementitious binder, the cement kiln dust including chlorine in an amount greater than 0.1% by weight of the cement kiln dust,
   the cementitious binder providing a cementitious settable composition when added with water, wherein for a density from about 12 pounds per gallon to about 11 pounds per gallon obtained without a lightweight additive, said cementitious settable composition exhibits a 24 hour compressive strength at 100 F, as hardened, of at least 700 psi.

2. The binder of claim 1, wherein for a non-zero amount of silica fume in the binder, the settable composition exhibits at 13 pounds per gallon, without a lightweight additive, a 24 hour compressive strength at 100 F, as hardened, of at least 800 psi.

3. The binder of claim 1, comprising microspheres in an amount less than about 16% by weight of the cementitious binder, wherein the cementitious binder provides a cementitious settable composition, when added with water, that has a density lower than 11 pounds per gallon and a 24 hour compressive strength at 100 F, as hardened, of at least 500 psi.

4. The binder of claim 3, wherein the cementitious settable composition has a density of about 10 pounds per gallon.

5. The binder of claim 3, wherein the settable composition has a 24 hour compressive strength at 100 F, as hardened, of at least 700 psi.

6. The binder of claim 5, wherein the settable composition has a 24 hour compressive strength at 100 F, as hardened, of at least 800 psi.

7. The binder of claim 1, comprising microspheres in an amount less than about 35% by weight of the cementitious binder, wherein the cementitious binder provides a cementitious settable composition, when added with water, that has a density of about 8 pounds per gallon and a 24 hour compressive strength at 100 F, as hardened, of at least 500 psi.

8. The binder of claim 1, wherein chlorine is present in the cement kiln dust in an amount up to 5% by weight of the cement kiln dust.

9. The binder of claim 1, wherein cement kiln dust is present in the cementitious binder in an amount in the range of from about 15 to 25% by weight of the cementitious binder.

10. The binder of claim 1, wherein metakaolin is present in the cementitious binder in an amount in the range of from about 8 to 25% by weight of the cementitious binder.

11. The binder of claim 1, wherein metakaolin is present in the cementitious binder in an amount in the range of from about 8 to 18% by weight of the cementitious binder.

12. The binder of claim 1, comprising microspheres in an amount in the range of from about 16% to 35% by weight of the cementitious binder, wherein the cementitious binder provides a cementitious settable composition, when added with water, that has a corresponding density in the range of from about 10 pounds per gallon to about 8 pounds per gallon and a 24 hour compressive strength at 100 F, as hardened, of at least 500 psi.

13. The binder of claim 1, further comprising limestone in an amount more than 5% by weight of the cementitious binder.

14. The binder of claim 1, wherein the cement kiln dust includes free lime in an amount of at least 1% by weight of the cement kiln dust.

15. A manufactured cementitious binder comprising:
    cement kiln dust in an amount of at least 10% by weight of the cementitious binder, the cement kiln dust including chlorine in an amount of greater than 0.1% by weight of the cement kiln dust,
    the cementitious binder providing a cementitious settable composition when added with water, wherein for a density from about 12 pounds per gallon to about 11 pounds per gallon obtained without a lightweight additive, said cementitious settable composition exhibits a 24 hour compressive strength at 100 F, as hardened, of at least 700 psi.

16. The binder of claim 15, comprising microspheres in an amount less than about 16% by weight of the cementitious binder, wherein the cementitious binder provides a settable composition, when added with water, that has a density lower than 11 pounds per gallon and a 24 hour compressive strength at 100 F, as hardened, of at least 500 psi.

17. The binder of claim 16, wherein the settable composition has a density of about 10 pounds per gallon.

18. The binder of claim 16, wherein the settable composition has a 24 hour compressive strength at 100 F, as hardened, of at least 700 psi.

19. The binder of claim 15, wherein chlorine is present in the cement kiln dust in an amount up to 5% by weight of the cement kiln dust.

20. A cementitious settable composition comprising:
    water; and
    a cementitious binder including
       hydraulic binder in an amount in the range of from about 40 to 75% by weight of the cementitious binder;
       metakaolin in an amount of at least 3% by weight of the cementitious binder;
       silica fume in an amount up to about 15% by weight of the cementitious binder;
       cement kiln dust in an amount of at least 10% by weight of the cementitious binder, the cement kiln dust including chlorine in an amount greater than 0.1% by weight of the cement kiln dust,
       wherein for a density from about 12 pounds per gallon to about 11 pounds per gallon obtained without a lightweight additive, said cementitious sellable composition exhibits a 24 hour compressive strength at 100 F, as hardened, of at least 700 psi.

21. The composition of claim 20, wherein for a non-zero amount of silica fume in the binder, the settable composition exhibits at 13 pounds per gallon, without a lightweight additive, a 24 hour compressive strength at 100 F, as hardened, of at least 800 psi.

22. The composition of claim 20, wherein the cementitious binder comprises microspheres in an amount less than about 16% by weight of the cementitious binder, wherein the cementitious binder provides a cementitious settable composition, when added with water, that has a density lower than 11 pounds per gallon and a 24 hour compressive strength at 100 F, as hardened, of at least 500 psi.

23. The composition of claim 22, wherein the settable composition has a density of about 10 pounds per gallon.

24. The composition of claim 22, wherein the settable composition has a 24 hour compressive strength at 100 F, as hardened, of at least 700 psi.

25. The composition of claim 20, wherein chlorine is present in the cement kiln dust in an amount up to 5% by weight of the cement kiln dust.

26. A method of cementing comprising:
   providing a cementitious settable composition comprising:
      water; and
      a cementitious binder including
         hydraulic binder in an amount in the range of from about 40 to 75% by weight of the cementitious binder;
         metakaolin in an amount of at least 3% by weight of the cementitious binder;
         silica fume in an amount up to about 15% by weight of the cementitious binder; and
         cement kiln dust in an amount of at least 10% by weight of the cementitious binder, the cement kiln dust including chlorine in an amount greater than 0.1% by weight of the cement kiln dust,
      the cementitious binder providing the cementitious settable composition when added with water, wherein for a density from about 12 pounds per gallon to about 11 pounds per gallon obtained without a lightweight additive, said cementitious settable, composition exhibits a 24 hour compressive strength at 100 F, as hardened, of at least 700 psi; and
   introducing the cementitious settable composition into an underground formation.

27. The method of claim 26, wherein for a non-zero amount of silica fume in the binder, the settable composition exhibits at 13 pounds per gallon, without a lightweight additive, a 24 hour compressive strength at 100 F, as hardened, of at least 800 psi.

28. The method of claim 26, wherein the cementitious binder comprises microspheres in an amount less than about 16% by weight of the cementitious binder, wherein the cementitious binder provides a cementitious settable composition, when added with water, that has a density lower than 11 pounds per gallon and a 24 hour compressive strength at 100 F, as hardened, of at least 500 psi.

29. The method of claim 26, wherein the underground formation is a well bore.

30. A manufactured cementitious binder for preparing low density cementitious settable compositions having a density lower than about 12 ppg, the binder comprising:
   hydraulic binder in an amount in the range of from about 40 to 75% by weight of the cementitious binder;
   metakaolin in an amount of at least 3% by weight of the cementitious binder;
   silica fume in an on-zero amount up to about 15% by weight of the cementitious binder; and
   cement kiln dust in an amount of at least 10% by weight of the cementitious binder, the cement kiln dust including chlorine in an amount greater than 0.1% by weight of the cement kiln dust.

* * * * *